(12) United States Patent
Gretz

(10) Patent No.: US 9,048,645 B1
(45) Date of Patent: Jun. 2, 2015

(54) ELECTRICAL BOX ASSEMBLY WITH SIDING BLOCK AND WHILE-IN-USE COVER

(71) Applicant: Arlington Industries, Inc., Scranton, PA (US)

(72) Inventor: Thomas J. Gretz, Port St. Lucie, FL (US)

(73) Assignee: ARLINGTON INDUSTRIES, INC., Scranton, PA (US)

( * ) Notice: Subject to any disclaimer, the term of this patent is extended or adjusted under 35 U.S.C. 154(b) by 0 days.

(21) Appl. No.: 14/197,265

(22) Filed: Mar. 5, 2014

Related U.S. Application Data

(60) Provisional application No. 61/773,390, filed on Mar. 6, 2013.

(51) Int. Cl.
*H02G 3/08* (2006.01)

(52) U.S. Cl.
CPC ..................... *H02G 3/081* (2013.01)

(58) Field of Classification Search
USPC ............................................ 174/50; 439/535
See application file for complete search history.

(56) References Cited

U.S. PATENT DOCUMENTS

| 6,242,696 | B1 * | 6/2001 | Reiker | 174/62 |
| RE41,661 | E * | 9/2010 | Dinh | 174/50 |
| 8,536,453 | B2 * | 9/2013 | Qin | 174/50 |

* cited by examiner

*Primary Examiner* — Dhirubhai R Patel

(57) ABSTRACT

A weatherproof while-in-use electrical box assembly adapted for use on buildings that include a siding exterior or that will be finished with siding. The weatherproof electrical box assembly includes an electrical box with an integral siding block and a cover assembly adapted to receive large electrical plugs. The integral siding block provides a channel around the electrical box for accommodating siding. The channel enables the electrical box assembly to channel water to the bottom of the box and exterior of the siding where it will drip harmlessly to the ground. The cover assembly includes cord openings that enable closing of the cover plate while electrical cords are connected to electrical outlets within the electrical box. Cord inserts are provided for closing the cord openings when they are not in use. The tamperproof cover includes an arm adapted to accept a padlock for securing the cover to the electrical box.

12 Claims, 10 Drawing Sheets

ELECTRICAL BOX ASSEMBLY WITH SIDING BLOCK AND WHILE-IN-USE COVER

This application claims the priority of U.S. Provisional Application Ser. No. 61/773,390 filed Mar. 6, 2013.

FIELD OF THE INVENTION

This invention relates to electrical boxes, and specifically to an electrical box with a siding block and a while-in-use cover.

BACKGROUND OF THE INVENTION

Electrical FS boxes for outdoor use are typically mounted on the exterior of buildings for providing convenient access to electrical outlets and other electrical devices such as switches and timers. Conventional FS boxes typically are a simple rectangular box configuration with a back wall and four side walls. When being mounted to a building, a rectangular hole must be cut in the substrate in order to mount the electrical box to the building. Cutting into the substrate creates a costly and time consuming repair job for the installer as he must typically caulk around the perimeter of the electrical box to seal against rain penetration between the box and the substrate. Although the caulk is meant to seal around the box, it is difficult to obtain a perfect seal making it likely that rain or water could seep behind the siding surrounding the box. Furthermore, cutting into the substrate can disrupt and damage the building's insulation layer that typically resides just under the substrate. There is also the problem of potentially damaging electrical wiring that is behind the area of the cut.

What is needed is an electrical box assembly that minimizes the need to cut a hole in the substrate and that accommodates siding in a manner that eliminates water seepage behind the siding. The electrical box assembly should be weatherproof, providing protection against rain and weather to a receptacle mounted therein while an electrical cord is plugged into the receptacle and also when the receptacle is not in use. The electrical box should furthermore include a cover member to accommodate large electrical plugs. The term "siding" as used herein includes stucco.

SUMMARY OF THE INVENTION

The invention is a weatherproof while-in-use electrical box assembly adapted for use on buildings that include a siding exterior or that will be finished with siding. The weatherproof while-in-use electrical box assembly includes an electrical box with an integral siding block and a cover assembly. The integral siding block provides a 360-degree channel around the electrical box for accommodating siding. The channel enables the electrical box assembly to channel water to the bottom of the box and exterior of the siding where it will drip harmlessly to the ground. The cover assembly is tamperproof and is adapted to receive large electrical plugs. The cover assembly includes cord openings that enable closing of the cover plate while electrical cords are connected to electrical outlets within the electrical box. The weatherproof electrical box assembly includes cord inserts for closing the cord openings when not in use to keep the assembly weatherproof when not in use. The tamperproof cover includes an arm adapted to accept a padlock for securing the cover to the electrical box thereby imparting a security function to the assembly.

OBJECTS AND ADVANTAGES

A first object is to eliminate the need for an installer to cut a large hole in the outer substrate of the house in order to install an electrical box on a building either covered with siding or under construction to be finished with siding. Cutting a large hole in the substrate can damage the insulation of a house and cause extra repair work for the contractor or homeowner. The present invention, by providing a siding block integral with the electrical box, eliminates the need for cutting a large hole in the substrate. The electrical box assembly of the present invention requires only a small hole to be made in the substrate in order to pull wiring into the box.

A second object of the invention is to provide an electrical box assembly that combines the utility of an FS box with an integral siding block for providing a 360-degree waterproof channel for accommodating siding around the periphery of the electrical box and channeling water away from the box and the surrounding siding.

A third object is to combine the functionality of a while-in-use cover with an FS style electrical box.

A further object is to provide a cover that is able to accept large electrical plugs of electrical cords while in use.

A further object of the invention is to provide tamperproof functionality to the electrical box assembly. The cover member is lockable to the electrical box portion of the assembly.

Another object is to provide smooth cord openings in the electrical box to eliminate fraying of electrical cords while the cords are plugged into the box.

Another object is to include reusable cord inserts to make the electrical box assembly weatherproof while the electrical box is not in use.

A further object is to enable installation of the electrical box assembly in either an old work situation or a new work situation. The electrical box assembly includes a removable base flange to convert the assembly so that it can be installed in an old work situation, wherein the siding is installed on the building.

These and other objects and advantages of the present invention will be better understood by reading the following description along with reference to the drawings.

BRIEF DESCRIPTION OF THE SEVERAL VIEWS OF THE DRAWING(S)

Reference is made herein to the accompanying drawings, which are not necessarily drawn to scale, and wherein.

DETAILED DESCRIPTION

Figure 1:
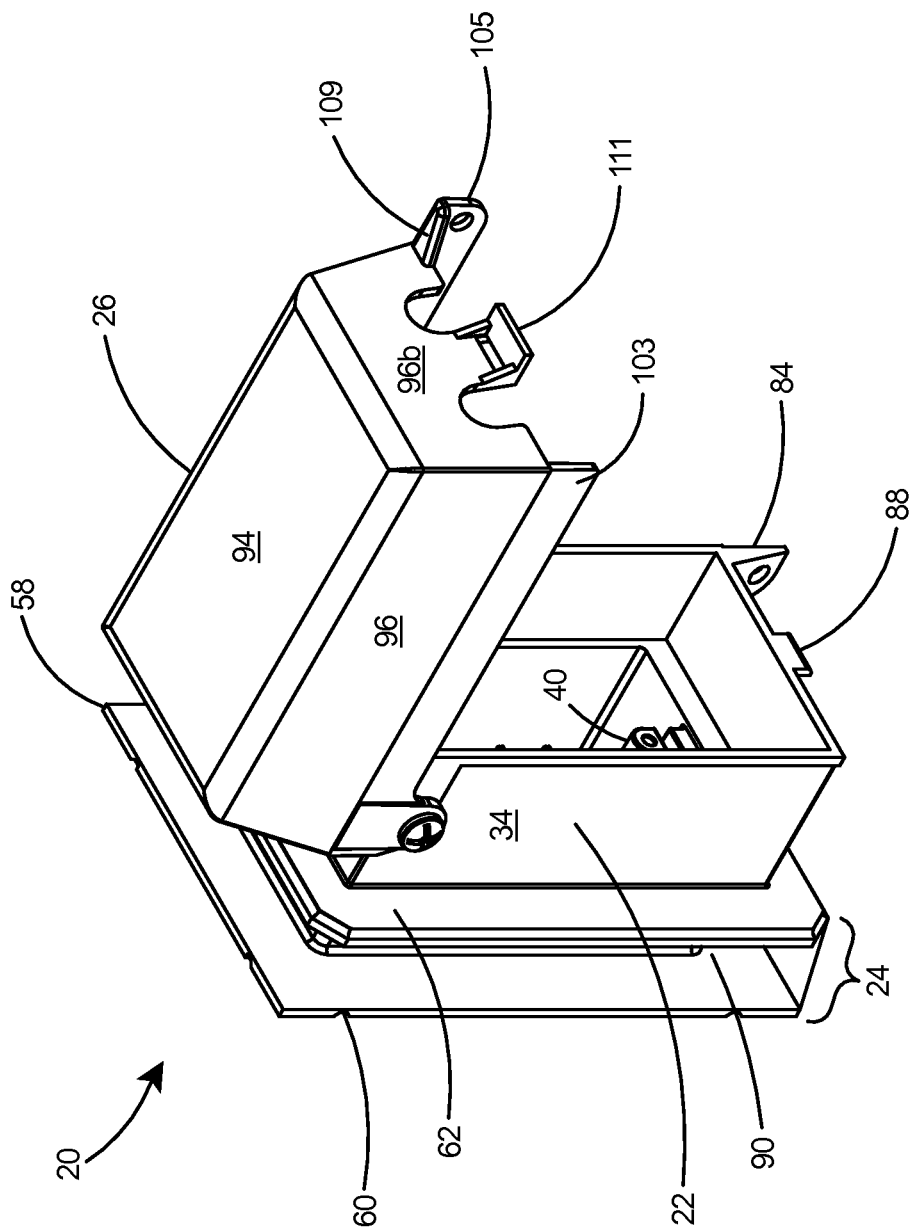
FIG. 1 is an isometric view of the preferred embodiment of an electrical box assembly with an integral siding block and a while-in-use cover in accordance with embodiments of the invention.

With reference to FIG. 1, the present invention comprises an electrical box assembly 20 for mounting electrical components to the exterior of a finished building with siding installed on the exterior or to an unfinished building whose exterior that will be finished with siding. The electrical box assembly 20 includes an electrical box 22 with an integral siding block 24 and a while-in-use cover 26.

Figure 2:
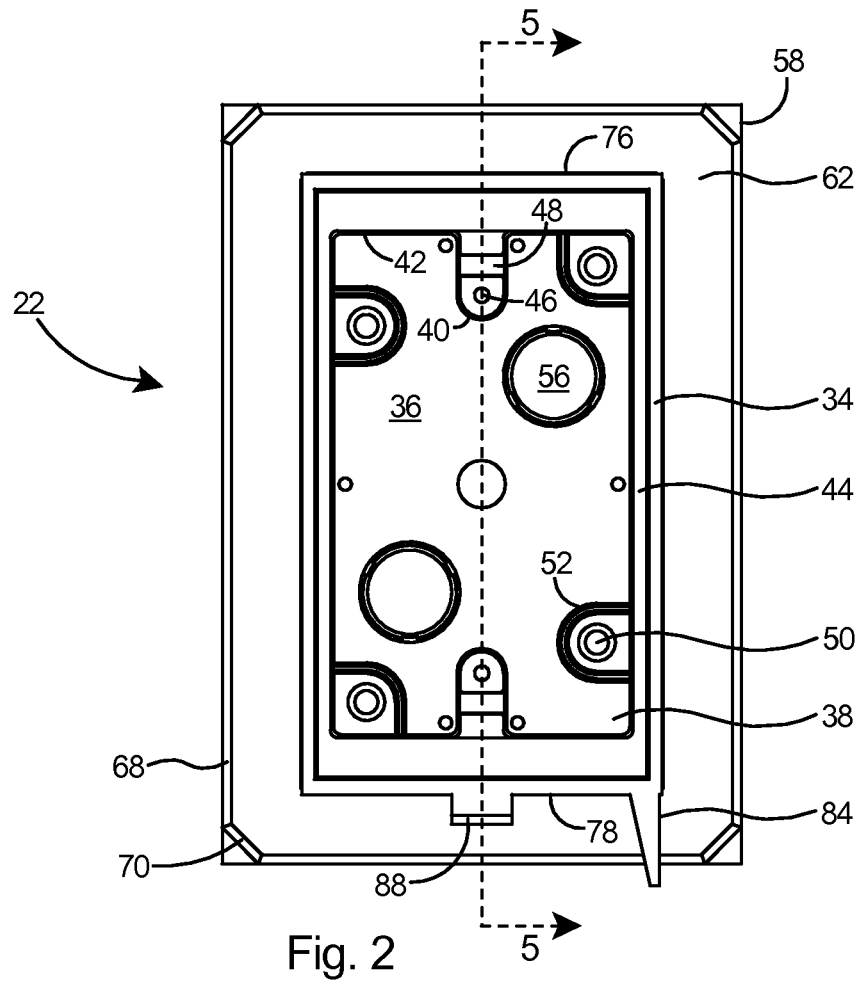
FIG. 2 is a front view of an electrical box which forms a portion of the electrical box assembly of FIG. 1.
Figure 3:
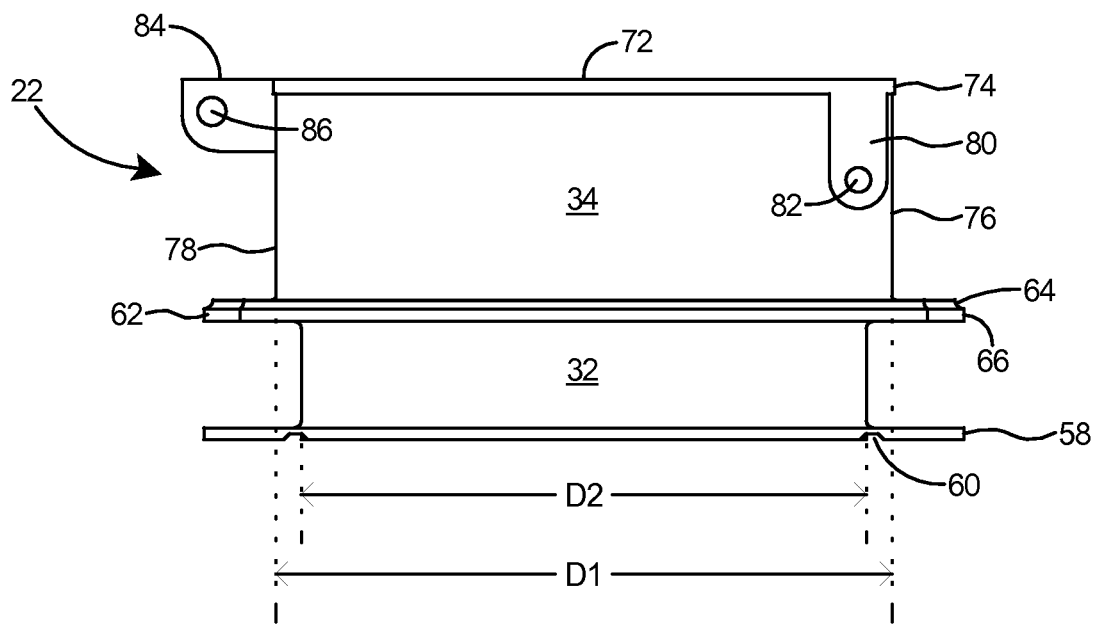
FIG. 3 is a side view of the electrical box of FIG. 2.

Referring to FIGS. 2-3, the electrical box 22 includes four inner sidewalls 32, four outer sidewalls 34, and a back wall 36 that define the inner enclosure or cavity 38. Outer sidewalls 34 are of a larger dimension D1 than the inner sidewalls 32 of dimension D2. Two bosses 40 extend from the inner surface 42 of the outer sidewalls 34. A peripheral wall 44 extends between the inner sidewalls 32 and outer sidewalls 34. Bosses 40 include component mounting bores 46 therein and a groove 48 adjacent the mounting bores 46 and extending fully across each boss 40.

The electrical box 22 includes a plurality of apertures 50 in the back wall 36 with each of the apertures 50 including a surrounding peripheral wall 52 extending inward of the back wall 36. The back wall 36 further includes a plurality of knockouts 56 therein. A base flange 58 extends from the entire periphery of the inner sidewalls 32. The base flange 58 is coplanar with the back wall 36 and includes breakaway grooves 60 therein. A second flange 62 extends from the outer periphery of the outer sidewalls 34 and includes a wide base portion 64 and a smaller outer portion 66 that includes a beveled edge 68 and four truncated corners 70. The outer sidewalls 34 include a front edge 72 and a peripheral wall 74 extending laterally outward around the entire outer periphery of the front edge 72.

As shown in FIG. 3, electrical box 22 sidewalls 34 include a top end 76 and a bottom end 78. Opposing outer sidewalls 34 of top end 76 include ears 80, which are thick wall sections with apertures 82 therein. Bottom end 78 of the outer sidewalls 34 includes a leg 84 at one end. The leg 84 includes an aperture 86 therein. A tab 88 extends downward from the outer surface of one outer sidewall 34.

Figure 4:
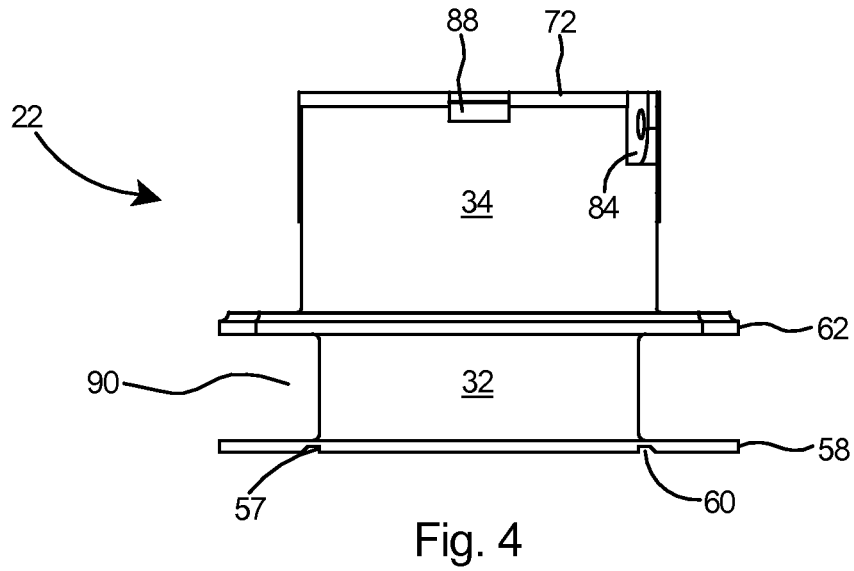
FIG. 4 is an end view of the electrical box.
Figure 5:
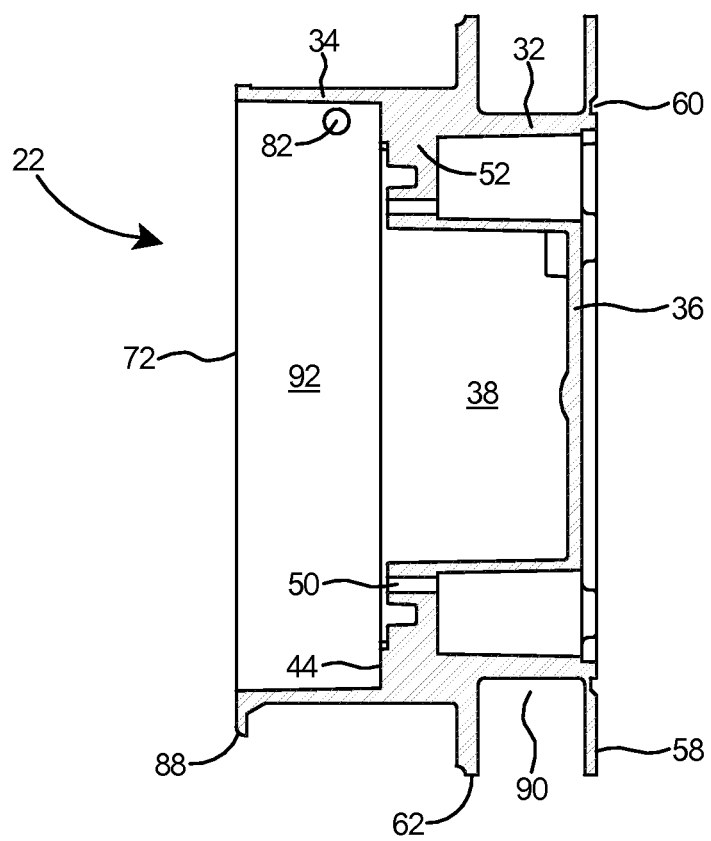
FIG. 5 is a sectional view of the electrical box taken along line 5-5 of FIG. 2.

Referring to FIGS. 4 and 5, base flange 58 in combination with inner sidewalls 32 and second flange 62 define a channel 90 that aides removal of water from around the electrical box assembly and the siding (not shown) installed around its periphery. The breakaway grooves 60 in the back wall 36 of electrical box 22 enable an installer to modify the electrical box 22 for installation on an existing structure or old work situation. By scoring with a utility knife or similar sharp blade, an installer can remove the base flange 58 from the electrical box 22. With the base flange 58 removed, a rectangular hole, large enough to receive the inner sidewalls 32, may be cut in the siding (not shown) to accommodate the electrical box. For new construction, the base flange 58 is retained with the box 22, and the electrical box is secured to the substrate by driving nails through apertures 50 in back wall 36. Base flange 58 underlies the siding and shields the substrate from rain or water penetration. Any rain or water falling in channel 90 will fall to the bottom of the electrical box channel 90 and from thence fall away from the siding. As shown in FIG. 5, the electrical box 22 includes an outer cavity 92 defined by peripheral wall 44 and outer sidewalls 34. Outer cavity 92 is adapted to house an electrical component such as a duplex receptacle (not shown). The electrical component will seat flush against peripheral wall 44 and thus be recessed within the building wall that the electrical box 22 is secured to. Inner cavity 38 provides an enclosure for making wiring connections to the electrical component.

Figure 6:
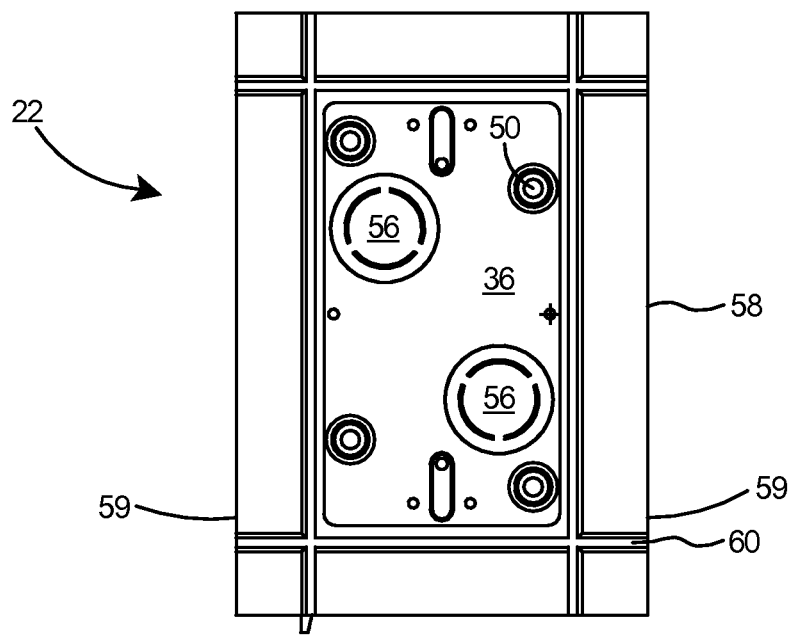
FIG. 6 is a rear view of the electrical box.
Figure 7:
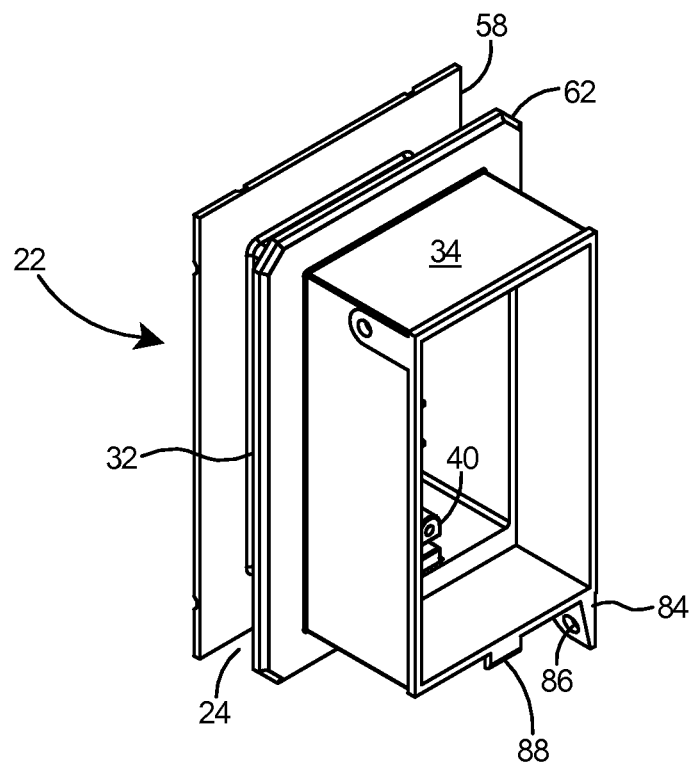
FIG. 7 is a front isometric view of the electrical box.

With reference to FIG. 6, the breakaway grooves 60 are formed around the entire periphery of the inner sidewalls 32. Thus flange 58 may be removed by scoring, with a utility knife or similar sharp blade, along grooves 60 and then breaking away flange 58 from the remainder of the electrical box 22. Such a modification would be made in an old work situation, in order to adapt the electrical box to fit within a smaller hole in the siding. The breakaway grooves 60 extend completely from side 59 to side 59 of the electrical box.

Figure 8:
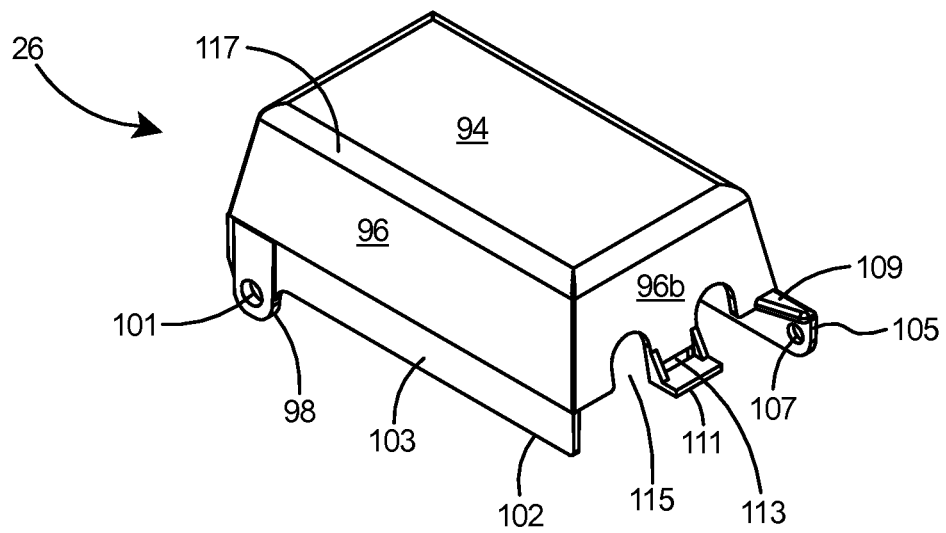
FIG. 8 is a front isometric view of a while-in-use cover member box which forms a portion of the electrical box assembly of FIG. 1.
Figure 9:
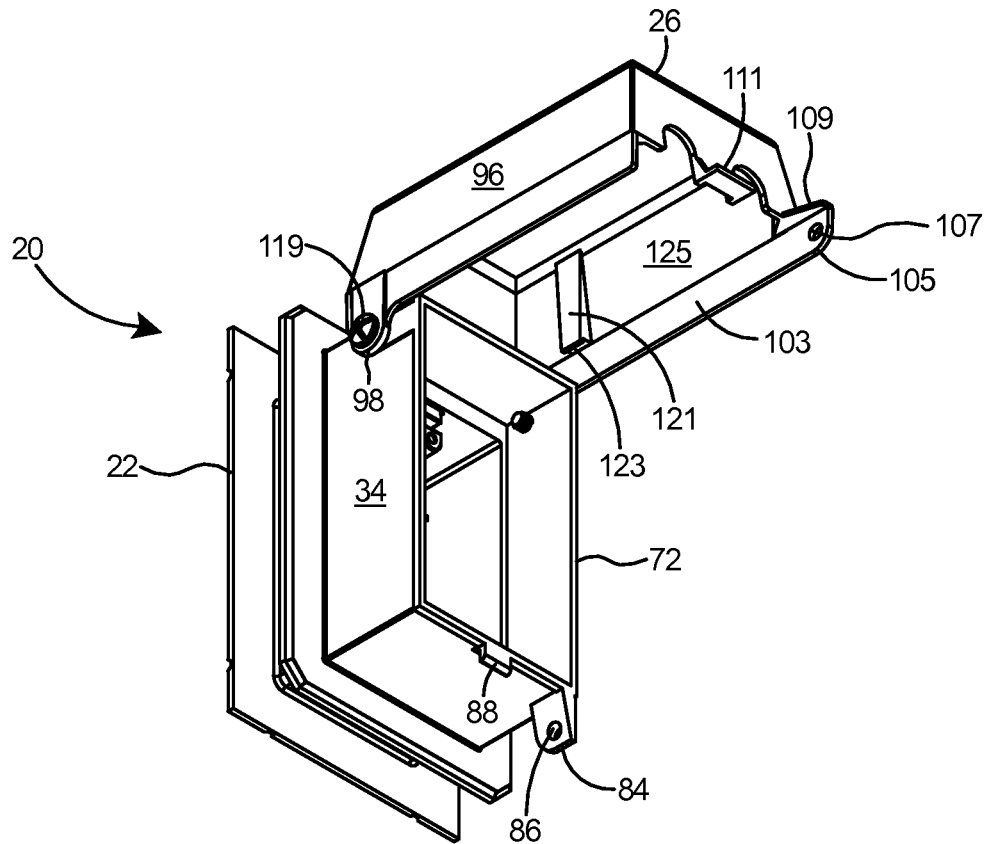
FIG. 9 is an isometric view of the electrical box assembly with the cover open.
Figure 10:
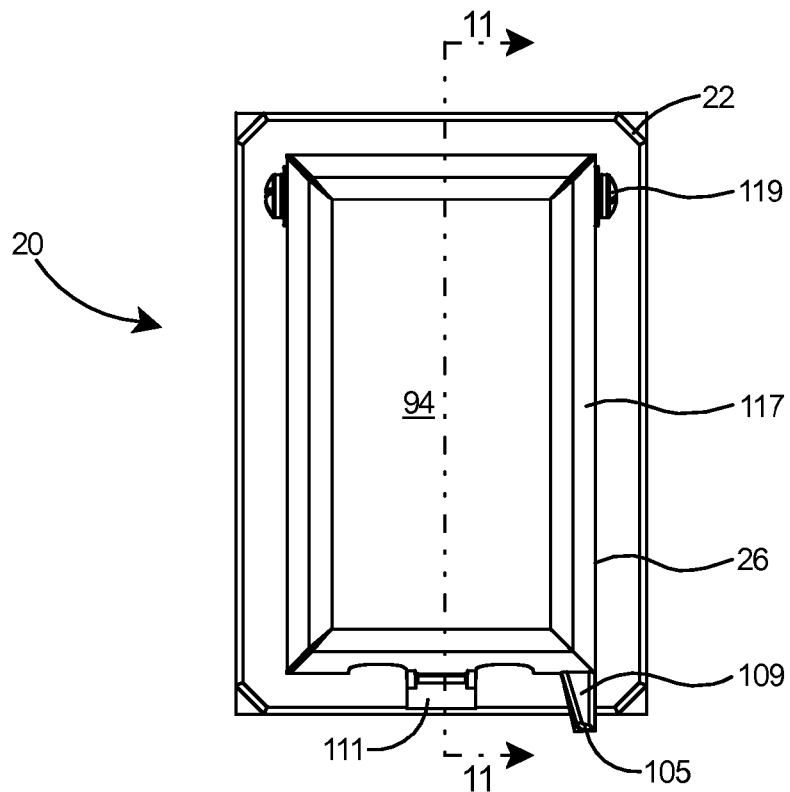
FIG. 10 is a front elevation view of the electrical box assembly of FIG. 1.

Referring to FIGS. 8 and 9, the cover 26 includes a front panel 94, four sidewalls 96, two ears 98 on opposing sidewalls, and apertures 101 in each ear 98 that are in axial alignment with one another. Sidewall panels 103 extend from three of the sidewalls 96. The sidewall panels 103 and sidewalls 96 meet at a juncture 104. An arm 105 extends from one end of the bottom sidewall 96b and includes an aperture 107 therein. A brace 109 extends from the bottom sidewall 96b to the arm 105. The brace 109 is substantially planar and is orthogonal to the plane of the arm 105. The cover 26 further includes a latch 111 with an opening 113 therein and two U-shaped openings 115 in the bottom sidewall 96b. The cover 26 includes a beveled edge 117 at the juncture of the front panel 94 and each sidewall 96. The ears 98 extend outward from the plane including the rear edge 102 of the sidewall panels 103.

With reference to FIG. 9, cover member 26 is secured to electrical box 22 by bolts 119 extending through the ears 98 of the cover 26 and through the outer sidewall 34 of the electrical box. Cover 26 further includes a jam 121 including a flat abutment surface 123 extending from the inner surface 125 of the cover. Flat abutment surface 123 is in alignment with the juncture 104 between the cover sidewall 96 and the sidewall panel 103. The jam 121 cooperates with brace 109 in leveling the cover 26 with respect to the front edge 72 of the electrical box 22. When cover 26 is closed on electrical box 22, aperture 107 in arm 105 of cover 26 is in axial alignment with aperture 86 in leg 84 of electrical box 22.

Figure 11:
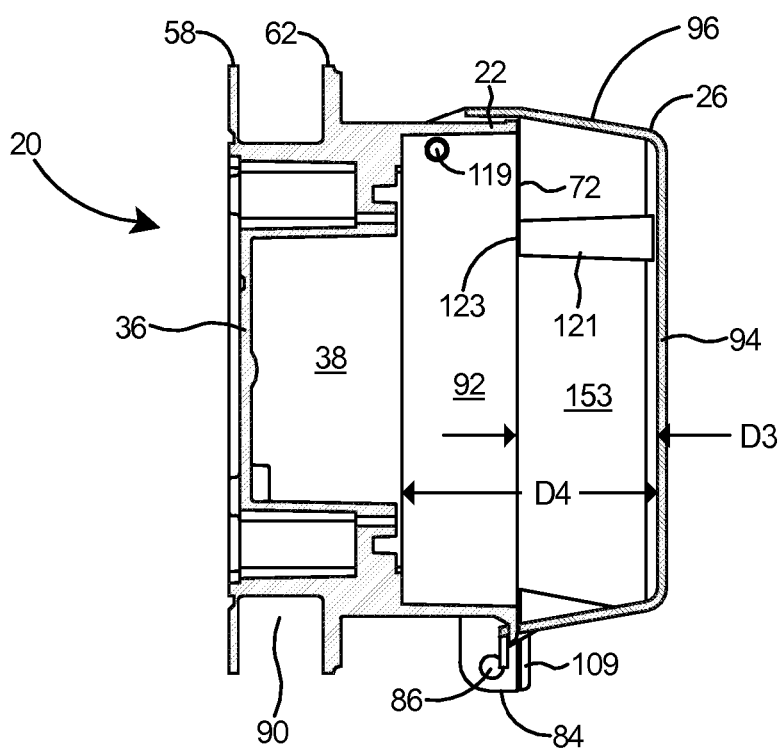
FIG. 11 is a sectional view of the electrical box assembly taken along line 11-11 of FIG. 10.

Referring to FIG. 11, the cover member 26 is hinged to the electrical box 22 by bolts 119. When the cover 26 is closed upon the electrical box 22, brace 109 near the bottom of the box and flat abutment surface 123 of jam 121 each contact the front edge 72 of the electrical box 22 and maintain panel 94 of cover parallel with the front edge 72 of the electrical box 22.

Figure 12:
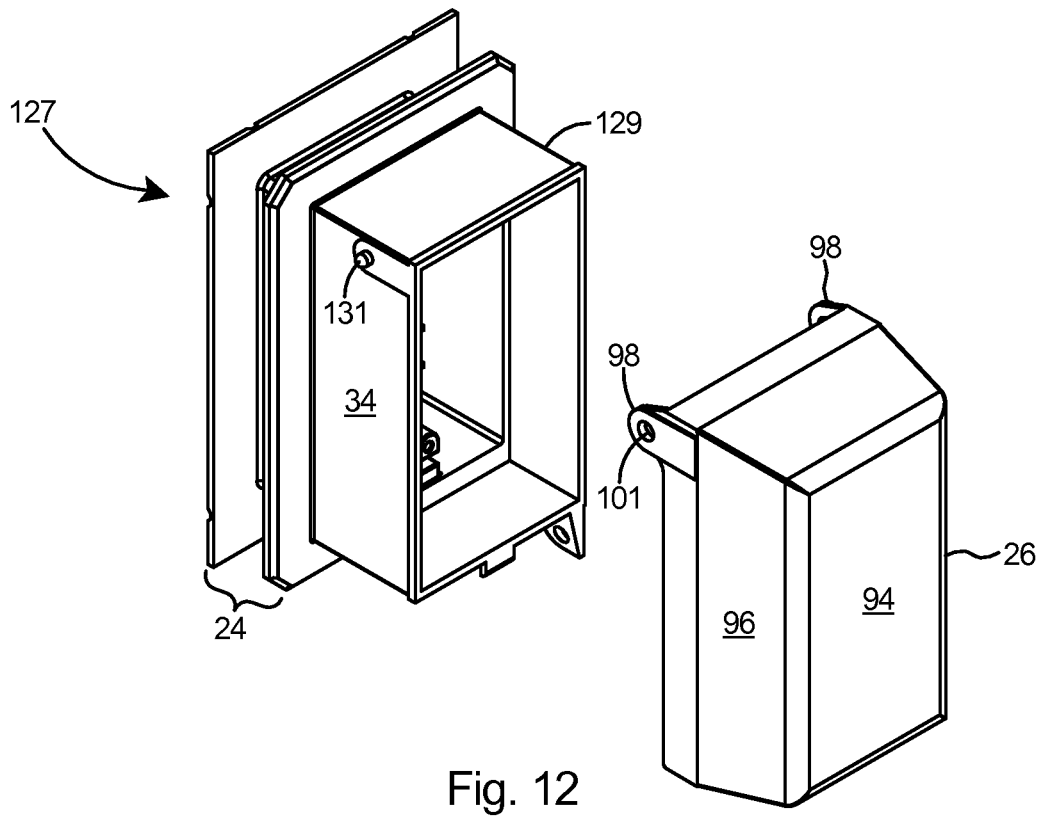
FIG. 12 is an exploded isometric view of the electrical box assembly depicting the cover member separate from the electrical box.
Figure 13:
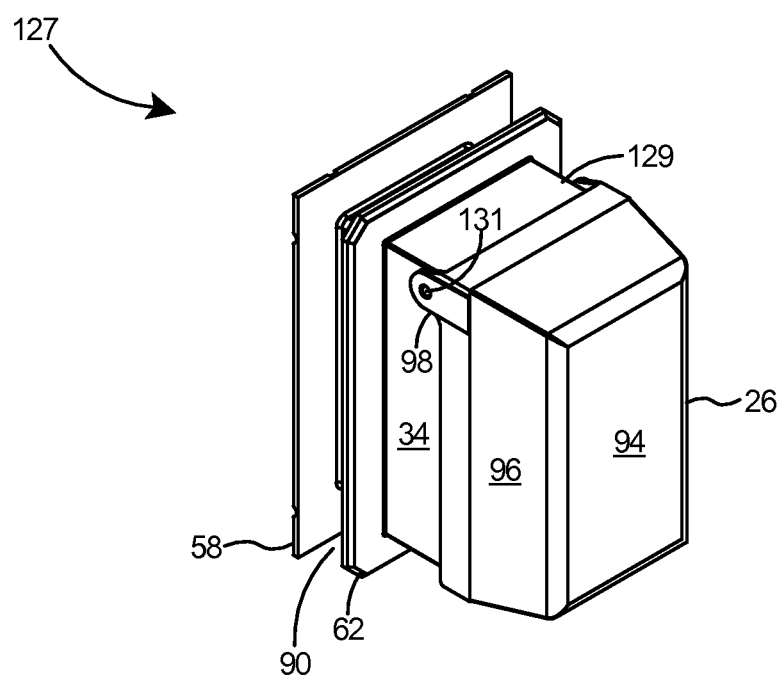
FIG. 13 is an isometric view of an electrical box assembly according to the present invention with the cover member in the closed position.

FIGS. 12 and 13 illustrate an alternative embodiment of the electrical box assembly 127 which includes an alternative means of connecting cover member 26 to the box. In this embodiment, electrical box 129 includes posts 131 integral with and extending from opposing sides of the outer sidewalls 34. Ears 98 of cover member 26 are flexible and are slipped over the electrical box 129 and posts 131 wherein the cover becomes operatively hinged to the electrical box.

Figure 14:
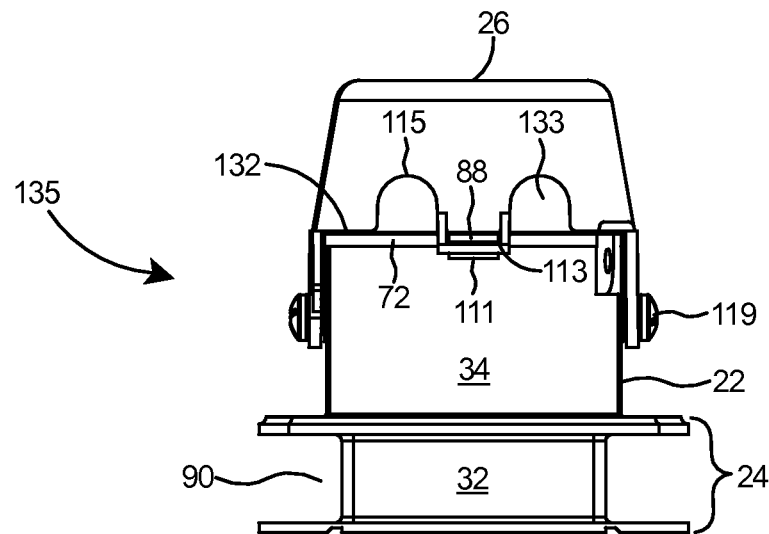
FIG. 14 is a bottom view of the electrical box assembly of FIG. 13, with the cover in the closed position.

With reference to FIG. 14, with the cover 26 closed on the electrical box 22, U-shaped openings 115 abut the front edge 72 of the electrical box 22 and form two smooth-walled while-in-use cord openings 133 through which electrical cords (not shown) can be passed. Closing of cover 26 upon electrical box 22 further causes latch 111 of cover to engage tab 88 of electrical box to snap lock the cover 26 to the box 22. The electrical cord openings 133 are formed on the bottom sidewall 96b of the electrical box assembly at the juncture 132 of the cover 26 and the outer sidewall 34 of the electrical box 22. As cover 26 is closed on the box 22, tab 88 snaps through opening 113 in latch 111.

Figure 15:
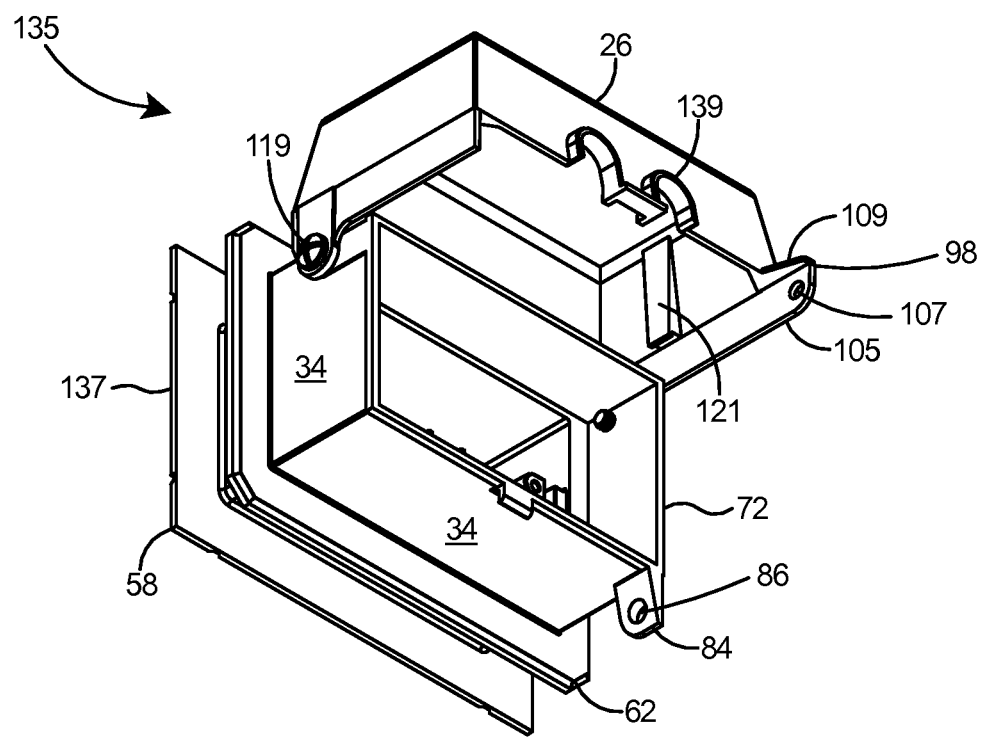
FIG. 15 is an isometric view of a second embodiment of the electrical box assembly of the present invention.

With reference to FIG. 15, there is shown another alternative embodiment of the electrical box assembly 135. Electrical box assembly 135 includes a horizontal electrical box 137 versus the vertical electrical box of the first embodiment. Additionally, horizontal electrical box assembly 135 includes shrouds 139 surrounding the U-shaped openings 115 in the cover 26. When cover 26 is closed on electrical box 137, aperture 107 in arm 105 of cover 26 is in axial alignment with aperture 86 in leg 84 of electrical box 137.

Figure 16:
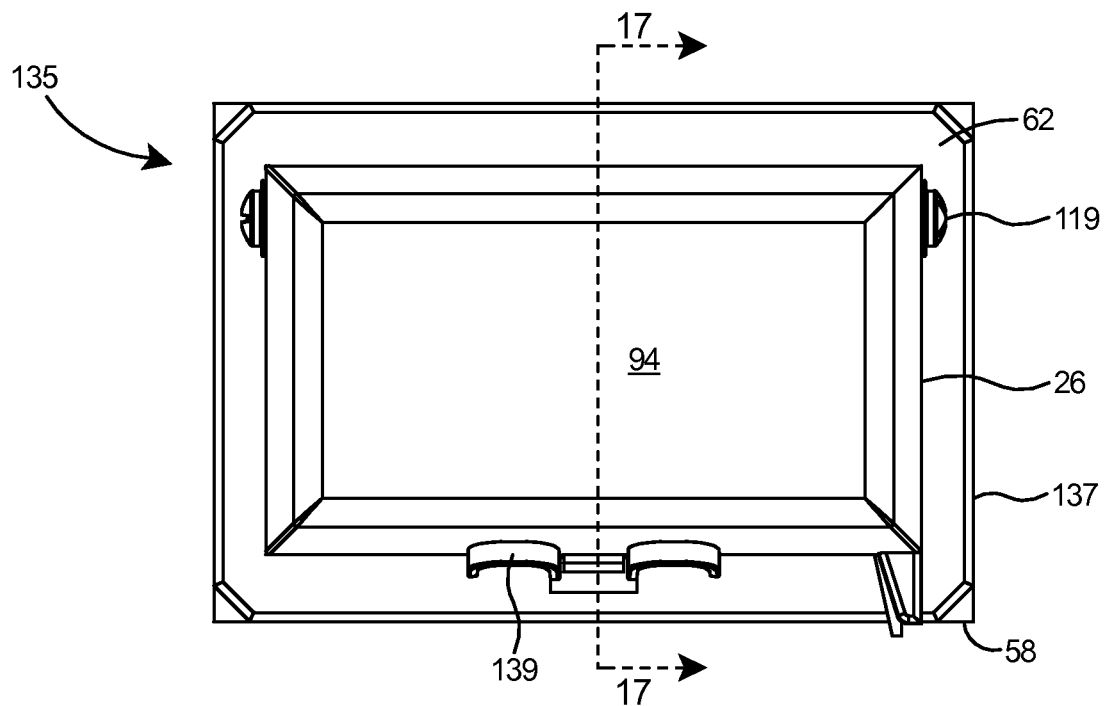
FIG. 16 is a front elevation of the electrical box assembly of FIG. 15.
Figure 17:
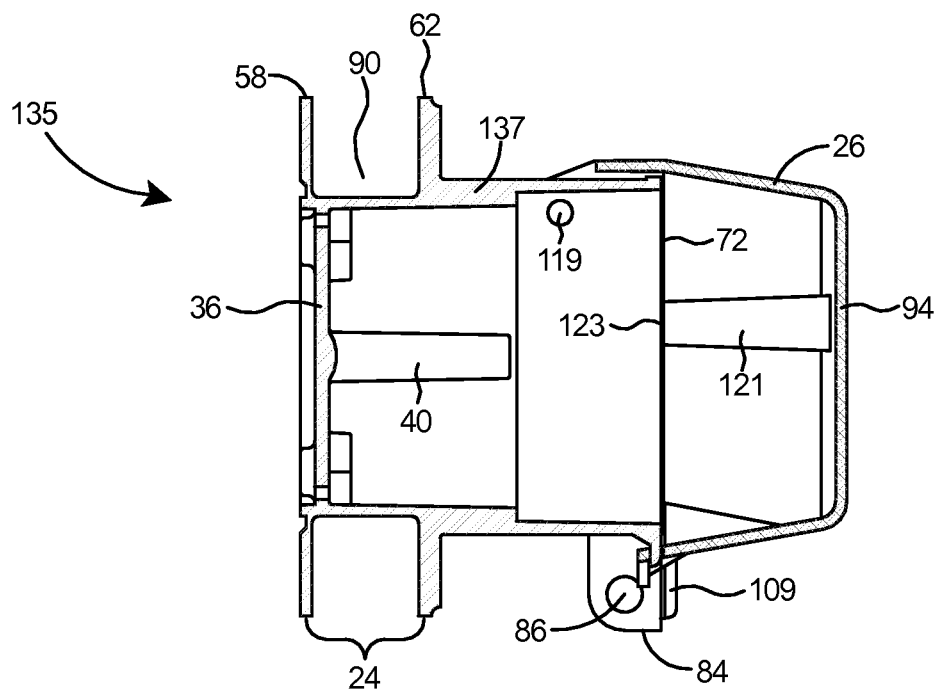
FIG. 17 is a sectional view of the second embodiment of the electrical box assembly taken along line 17-17 of FIG. 16.

Referring to FIGS. 16 and 17, the horizontal electrical box assembly 135, similar to the first embodiment, includes an integral siding block 24 including a base flange 58, a second flange 62, and the inner sidewalls 32 defining a channel 90 for receiving siding (not shown) therein. After the horizontal electrical box assembly 135 is secured to a wall and siding is installed around the assembly, any rain falling within the channel 90 will fall to the bottom of the siding block 24 and fall away from the siding. As in the first embodiment, when the cover 26 is closed upon the electrical box 137, brace 109 near the bottom of the box and flat abutment surface 123 of jam 121 each contact the front edge 72 of the electrical box 137 and align panel 94 of cover parallel with the front edge 72 of the electrical box 137.

Figures 18, 19:
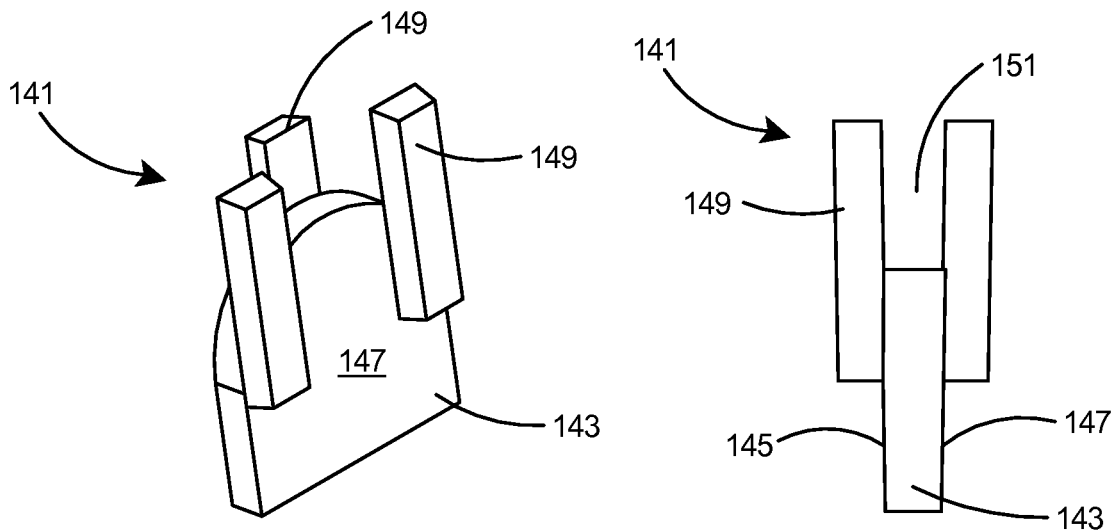
FIG. 18 is an isometric view of a cord opening plug which forms a portion of the electrical box assembly of FIG. 1.
FIG. 19 is a side view of the cord opening plug of FIG. 18.
Figure 20:
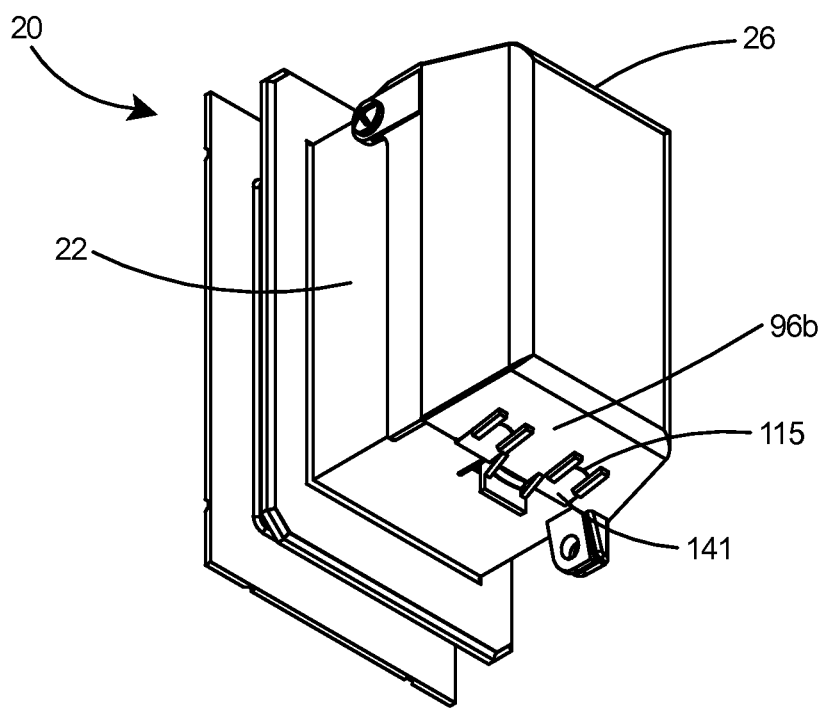
FIG. 20 is an isometric view of the electrical box assembly of the present invention with the while-in-use cover closed and plugs installed in the cord openings.

With reference to FIGS. 18 and 19, the electrical box assembly of the present invention includes cord opening plugs 141 that include a plug body 143 with two sides 145 and 147. Three legs 149 extend from the plug body 143 including one leg on a first side 145 and two legs on the opposing side 147 that are installed at the U-shaped openings 115 in the bottom sidewall 96b of the cover 26 as shown in FIG. 20. The plugs 141 are preferably molded in one piece of plastic. The legs 149 define a gap 151 that is slightly larger than the thickness of the sidewall 96b surrounding the U-shaped openings 115. The plugs 141 are supplied installed on the electrical box assembly 20 as shown in FIG. 20, but can be removed or subsequently installed by the homeowner as needed. When electrical cords (not shown) are connected to the receptacle within the box, the plugs are removed to provide cord openings for the cords. If the electrical cords are removed, the plugs 141 can be installed on the sidewall 96b at the U-shaped openings 115 in order to close the cord openings 133 (see FIG. 14) thereby further waterproofing the box and also preventing insects from entering the cord openings.

With reference to FIG. 11, as a result of the wide sidewalls 96 of the cover 26, the electrical box assembly 20 advantageously can accommodate large plugs (not shown) of electrical cords. The depth of the inside surface of the cover 26 from the front edge 72 of the electrical box 22, shown as distance D3, is preferably at least 1.5 inches. Distance D4 in the figure, the distance between the mounting face of the electrical component and the inside surface of the cover 26 is preferably at least 2.75 inches. The volume within the cover member 26 is preferably at least 22 cubic inches. The inner cavity 38 preferably includes a volume of at least 17 cubic inches. Thus the depth of the outer cavity 92 of the electrical box is the difference between D3 and D4, which is at least 1.25". This provides ample space for accommodating a f-inch long electrical plug within the outer cavity 92. A large electrical plug as described herein is one that is over ¾-inch in length.

The electrical box 22 and cover plate 26 of the present invention may be manufactured of metal or plastic. Most preferably the electrical box 22 and cover plate 26 of the present invention are each molded of plastic in one piece. In the preferred embodiment of the electrical box, the siding block 24, including the base flange 58 and second flange 62, are thus an integral portion of the one-piece molded electrical box 22.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. An electrical box assembly comprising:
   an electrical box including inner sidewalls and outer sidewalls having a front edge;
   said electrical box including a leg extending from said outer sidewalls of said electrical box and an aperture in said leg;
   a siding block extending from said outer sidewalls of said electrical box, said siding block including a base flange and a second flange, said siding block extending between said base flange and said second flange;
   said base flange in combination with inner sidewalls and second flange define a channel that prevents rain and water from penetrating the electrical box;
   a cover including a sidewall having an inner surface, a bottom sidewall having a brace extending there from and a U-shaped opening therein;
   an arm extending from said bottom sidewall of said cover; said arm including an aperture therein;
   a brace extending from said bottom sidewall of said cover to said arm of said cover; said brace is substantially planar and is orthogonal to a plane passing through said arm; and
   wherein closure of said cover on said electrical box axially aligns said aperture in said arm of said cover with said aperture in said leg of said electrical box.

2. The electrical box assembly of claim 1 including a channel on said electrical box assembly, said channel defined by said base flange and said second flange.

3. The electrical box assembly of claim 1 including a back wall on said electrical box.

4. The electrical box assembly of claim 3 wherein said base flange is coplanar with said back wall of said electrical box.

5. The electrical box assembly of claim 3 including a plurality of breakaway grooves in said back wall of said electrical box.

6. The electrical box assembly of claim 5 including an inner edge on each of said breakaway grooves.

7. The electrical box assembly of claim 3 including
   an aperture in said back wall of said electrical box; and a surrounding peripheral wall around said aperture, said surrounding peripheral wall extending inward of said back wall.

8. The electrical box assembly of claim 1 including a peripheral wall extending laterally outward from said electrical box at the front edge of said electrical box.

9. The electrical box assembly of claim 1 including
a sidewall panel extending from said sidewall of said cover; and
a juncture between said sidewall panel and said sidewall of said cover.

10. The electrical box assembly of claim 9 including
a jam extending from said inner surface of said sidewall of said cover; and
said jam cooperating with said brace in leveling said cover with respect to said front edge of said electrical box.

11. The electrical box assembly of claim 9 including
a rear edge on said sidewall panel; and
ears extending outward from said rear edge of said sidewall panel on opposing sides of said cover.

12. The electrical box assembly of claim 1 including
a tab on said electrical box;
a latch on said cover, said latch including an opening for engaging said tab of said electrical box.

* * * * *